United States Patent [19]

Chuang et al.

[11] Patent Number: 5,362,830

[45] Date of Patent: Nov. 8, 1994

[54] METHOD OF MAKING CROSSLINKED PVP

[75] Inventors: Jui-Chang Chuang, Wayne; Jenn S. Shih, Paramus; Robert B. Login, Oakland, all of N.J.

[73] Assignee: ISP Investments Inc., Wilmington, Del.

[21] Appl. No.: 122,834

[22] Filed: Sep. 15, 1993

Related U.S. Application Data

[62] Division of Ser. No. 966,489, Oct. 26, 1992, Pat. No. 5,283,305.

[51] Int. Cl.$^5$ .............. C08F 226/10; C08F 224/00; C08K 5/05; C08L 39/06
[52] U.S. Cl. .............................. 526/263; 526/264; 526/273; 524/765; 524/767; 524/808
[58] Field of Search ............... 526/264, 263; 524/765, 524/767, 808

[56] References Cited

U.S. PATENT DOCUMENTS 3,787,380  1/1974  Stamberger ..................... 526/264

*Primary Examiner*—Joseph L. Schofer
*Assistant Examiner*—Wu C. Cheng
*Attorney, Agent, or Firm*—Walter Katz; Marilyn J. Maue; Joshua J. Ward

[57] ABSTRACT

Crosslinkable copolymers of (a) 80–99% by wt. vinylpyrrolidone (VP) and 1–20% by wt. of a tertiary-amine-containing polymerizable monomer, e.g. vinylimidazole (VI) or 4-vinylpyridine (VPy), and (b) 80–99% by wt. VP and 1–20% by wt. of an epoxide-containing polymerizable monomer, e.g. allyl glycidyl ether (AGE) or glycidyl acrylate (GA), are reacted in solution, e.g. water, alcohol, or mixtures thereof, at a predetermined temperature, e.g. 50°–70° C., in a wt. ratio (solids basis) of (a):(b) of about 2:1 to 1:2, preferably about 1:1, in a solution concentration of about 10–30% of each, to provide a crosslinked PVP product, in gel form, suitable for use as an electrolead on a conductive foilbacking, or for bandages and wound dressings, and as a controlled release media for pharmaceuticals.

7 Claims, No Drawings

METHOD OF MAKING CROSSLINKED PVP

This is a division of U.S. application Ser. No. 07/966,489, filed Oct. 26, 1992, now U.S. Pat. No. 5,293,315.

BACKGROUND OF THE INVENTION

1. Field of the Invention

This invention relates to a method for making crosslinked polyvinylpyrrolidone (PVP) polymers by reaction between epoxide-containing PVP copolymers and tertiary-amine-containing PVP copolymers in solution at a predetermined temperature.

2. Description of the Prior Art

Merijan, in U.S. Pat. No. 3,563,968, described the preparation of functional graft homopolymers of vinyl lactams, e.g. vinyl pyrrolidone, by reaction of polyvinylpyrrolidone with allyl amine or allyl alcohol in ethanol solvent in a bomb reactor at 130°–140° C.

Kitcheil, in U.S. Pat. Nos. 4,692,328 and 4,772,484, disclosed the chemical crosslinking reaction of the Merijan functional graft homopolymers with glutaraldehyde to form a gel which was useful in biological applications.

PVP and PVP copolymers also have been physically crosslinked using E-beam or gamma radiation.

However, it would be of advantage to provide a simple method of crosslinking a mixture of stable, crosslinkable vinyl lactam polymers at a predetermined pH, without further condensation with glutaraldehyde, or the necessity of expensive radiation equipment.

SUMMARY OF THE INVENTION

Crosslinkable copolymers of (a) 80–99% by wt. vinylpyrrolidone (VP) and 1–20% by wt. of a tertiary-amine-containing polymerizable monomer, e.g. vinylimidazole (VI) or 4-vinylpyridine (VPy), and (b) 80–99% by wt. VP and 1–20% by wt. of an epoxide-containing polymerizable monomer, e.g. allyl glycidyl ether (AGE) or glycidyl acrylate (GA), are reacted in solution, e.g. water, alcohol, or mixtures thereof, at a predetermined temperature, e.g. 50°–70° C., in a wt. ratio (solids basis) of (a):(b) of about 2:1 to 1:2, preferably about 1:1, in a solution concentration of about 10–30% of each, to provide a crosslinked PVP product, in gel form, suitable for use as an electrolead on a conductive foilbacking, or for bandages and wound dressings, and as a controlled release media for pharmaceuticals.

DETAILED DESCRIPTION OF THE INVENTION

In accordance with the invention, there is provided a first (a) crosslinkable copolymers comprising 80–99% by wt. of VP and 1–20% by wt. of a tertiary-amine-containing polymerizable monomer, e.g. vinylimidazole (VI) or 4-vinylpyridine (VPy). This crosslinkable copolymer may be made in powder form by a precipitation polymerization process in an organic solvent, e.g. heptane, hexane, cyclohexane or mixtures thereof; or by a solution polymerization process, in aqueous, alcoholic or aqueous-alcoholic solution at a concentration of 10–30% by weight. The powder copolymer then is dissolved in water or a water-alcohol mixture to provide a suitable crosslinkable copolymer solution containing about 10–30% by weight of the copolymer for use herein.

The second (b) crosslinkable copolymer comprises 80–99% by wt. of VP and 1–20% by wt. of an epoxide-containing polymerizable monomer, e.g. allyl glycidyl ether (AGE) or glycidyl acrylate (GA), which also may be prepared by precipitation or solution polymerization.

A composition of the crosslinkable copolymers (a) and (b) then is mixed in water or water-alcohol solutions at a copolymer concentration of about 10–30% by weight and in a wt. ratio (solids basis) of about 2:1 to about 1:2, respectively, preferably about 1:1, at a predetermined temperature, e.g. about 50°–70° C. to form the desired crosslinked PVP product as a gel.

The invention now will be described in more detail by reference to the following examples. All parts are by weight except otherwise specified.

EXAMPLE 1

Preparation of Crosslinkable VP/VI (95/5) Copolymer by Precipitation Polymerization A 4-necked jacketed resin kettle fitted with a mechanical agitator, a reflux condenser/nitrogen inlet tube, a thermometer, and a monomer feeding tube, was charged with 350.0 g. of dry n-heptane, purged with nitrogen, heated to 64° C. with a circulated constant water bath and maintained at this temperature throughout the polymerization. Thereafter, 0.17 g. of t-butyl peroxypivalate (Lupersol 11, 75% active; Atochem NA) was added and a mixture of 47.50 g. of N-vinyl-2-pyrrolidone (VP) and 2.50 g. of N-vinylimidazole (VI) was metered in over a period of 2 hours and the reactants held for an additional 2 hours. After 15 minutes, the VP/VI copolymer began to precipitate as a white powder. At the end of second and fourth hours, 0.17 g. of Lupersol 11 were added. The VP/VI (95/5) copolymer then was cooled, filtered and vacuum-dried. The yield was 95.8% of a copolymer having a relative viscosity of 2.88.

EXAMPLES 2–4

The procedure of Example 1 was repeated except that the weight ratios of VP/VI were varied. The results are shown in Table 1 below:

TABLE 1

| Ex. No. | VP/VI Weight Ratio | Yield, % | Relative Viscosity |
|---|---|---|---|
| 2 | 85/15 | 92.4 | 3.36 |
| 3 | 90/10 | 91.6 | 3.40 |
| 4 | 98/2 | 90.8 | 1.51 |

EXAMPLES 5–7

The procedure of Example 1 was repeated except that the VP/VI monomer mix was replaced by a mixture of N-vinyl-2-pyrrolidone (VP) and allyl glycidyl ether (AGE) at different weight ratios, as shown in Table 2.

TABLE 2

| Ex. No. | VP/AGE Weight Ratio | Yield, % | Relative Viscosity |
|---|---|---|---|
| 5 | 90/10 | 94.2 | 2.24 |
| 6 | 95/5 | 93.2 | 1.95 |
| 7 | 98/2 | 91.6 | 1.53 |

EXAMPLE 8

Preparation of Crosslinkable VP/VI (95/5) Copolymer by Solution Polymerization

A 4-necked jacketed resin kettle fitted with a mechanical agitator, a reflux condenser, a nitrogen inlet tube, and a thermometer, was charged with 280.0 g. of distilled water, 114.0 g. of N-vinylpyrrolidone and 6.0 g. of N-vinylimidazole. The reactants were purged with nitrogen and heated to 65° C. with a circulated constant water bath and maintained at this temperature throughout the polymerization. Thereafter, 0.30 g. of t-butyl peroxypivalate (Lupersol 11, 75% active; Atochem NA) was added. The addition of the 0.30 g. amount of Lupersol 11 was repeated every 3 hours for three times. The reactants in water became viscous after heating for 30 minutes. After the 3rd and 9th hours of the polymerization, the reactants were diluted with 200 g. of water. At the end of the 12th hour, no residual VP and VI monomers were detectable by GC. The VP/VI (95/5) copolymer obtained was cooled and discharged. The copolymer had a solids content of 15.0% and a relative viscosity of 12.49.

EXAMPLES 9-16

The procedure of Example 8 was repeated to prepare the following crosslinkable PVP copolymers in water or isopropanol: N-vinyl-2-pyrrolidone/N-vinylimidazole (VP/VI) copolymer, N-vinyl-2-pyrrolidone/4-vinylpyridine (VP/VPy) copolymer, N-vinyl-2-pyrrolidone/allyl glycidyl ether (AGE) copolymer, and N-vinyl-2-pyrrolidone/glycidyl acrylate (VP/GA) copolymer. The monomer weight ratio, solvent, polymerization initiator (Lupersol 11, or, L-11), polymerization temperature and relative viscosity for each copolymer thus obtained are given in Table 3 below.

TABLE 3

Crosslinkable PVP Polymers by Solution Polymerization

| Ex. No. | VP | VI | VPy | AGE | GA | Solvent | Initiator | Reaction Temp. °C. | Relative* Viscosity |
|---|---|---|---|---|---|---|---|---|---|
| 8 | 95 | 5 | | | | Water | L-11 | 65 | 12.59 |
| 9 | 90 | 10 | | | | Isopropanol | L-11 | 65 | 1.57 |
| 10 | 97 | 3 | | | | Water | L-11 | 65 | 3.17 |
| 11 | 98 | 2 | | | | Water | L-11 | 65 | 3.32 |
| 12 | 95 | | 5 | | | Water | L-11 | 65 | 3.56 |
| 13 | 97 | | | 3 | | Water | L-11 | 65 | 3.26 |
| 14 | 98 | | | 2 | | Water | L-11 | 65 | 3.11 |
| 15 | 97 | | | | 3 | Water | L-11 | 65 | 1.96 |
| 16 | 98 | | | | 2 | Water | L-11 | 65 | 2.26 |

*Relative viscosity was determined on 1.00% aqueous polymer solution.

EXAMPLE 17

PVP hydrogels were prepared by heating a blend of aqueous solutions of an epoxide-containing PVP polymer (VP/AGE or VP/GA) and a tertiary-amine containing polymer (VP/VI or VP/VPy) at various polymer weight ratios. The aqueous polymer blends gelled within 16 hours (overnight) in a 55° C. forced air oven. The PVP hydrogels obtained ranged from a viscous, tacky gel to a semi-rigid, non-tacky gel.

TABLE 4

| Ex. | Polymer | % Solids | A | B | C | D | E | F | G |
|---|---|---|---|---|---|---|---|---|---|
| 2 | VP/VI (85/15) | 20 | 50 | 50 | | | | | |
| 8 | VP/VI (95/15) | 15 | | | 60 | | | | |
| 11 | VP/VI (98/2) | 15 | | | | 40 | 40 | | |
| 12 | VP/VPy (95/5) | 20 | | | | | | 50 | 50 |
| 6 | VP/AGE (95/5) | 20 | | 50 | 40 | | | 50 | |
| 7 | VP/AGE (98/2) | 20 | 50 | | | | | | |
| 14 | VP/AGE (98/2) | 20 | | | | 60 | | | |
| 16 | VP/GA (98/2) | 20 | | | | | | 60 | 50 |
| | | | 100 | 100 | 100 | 100 | 100 | 100 | 100 |

EXAMPLE 18

PVP hydrogels of different rigidity were prepared by heating aqueous solution blends of VP/AGE (97/3)-copolymer (Ex. 13) with VP/VI (97/3)-copolymer (Ex. 10), at various weight ratios.

TABLE 5

| | Parts by Weight in Compositions | | | | |
|---|---|---|---|---|---|
| | H | I | J | K | L |
| VP/VI (97/3), 20% (Ex. 10) | 40 | 33.3 | 26.7 | 20 | 13.3 |
| VP/AGE (97/3) 30% (Ex. 13) | 60 | 50 | 40 | 30 | 20 |
| D.I. Water | — | 16.7 | 33.3 | 50 | 66.7 |
| | 100.0 | 100.0 | 100.0 | 100.0 | 100.0 |
| % Solids | 24 | 20 | 16 | 12 | 8 |
| Gel | Semi-rigid | Semi-rigid | Semi-rigid | Soft | Soft |

TABLE 5-continued

| | Parts by Weight in Compositions | | | | |
|---|---|---|---|---|---|
| | H | I | J | K | L |
| Rigidity | tacky gel | tacky gel | tacky gel | tacky gel | tacky gel |

EXAMPLE 19

PVP hydrogels were prepared in the presence of a magnesium acetate which is an electrically conductive salt. Accordingly, a blend of VP/AGE (98/2)-copolymer (Ex. 7, 10 g.), VP/VI (98/2)-copolymer (Ex. 4, 10 g.), and magnesium acetate (5 g.) in distilled water (75 g.), was heated in a 55° C. forced air oven for 6 hours. A 20% soft, tacky, clear PVP gel was obtained which had a slightly yellowish color and contained 5% magnesium acetate. A summary of the reactants used in this Example is given in Table 6 below.

TABLE 6

| Reactants | Weight, g. |
|---|---|
| VP/VI (98/2) copolymer (Ex. 4) | 10.0 |
| VP/AGE (97/3) copolymer (Ex. 7) | 10.0 |
| Magnesium Acetate | 5.0 |
| D.I. Water | 75.0 |
| | 100.0 |

While the invention has been described with particular reference to certain embodiments thereof, it will be understood that changes and modifications may be made which are within the skill of the art. Accordingly, it is intended to be bound only by the following claims, in which:

What is claimed is:

1. A water-soluble crosslinkable copolymer consisting essentially of (i) 80–99% by weight of vinylpyrrolidone and (ii) 1–20% by weight of an epoxide-containing polymerizable monomer.

2. A water-soluble crosslinkable copolymer according to claim 1 wherein (ii) is allyl glycidyl ether or glycidyl acrylate.

3. A water-soluble crosslinkable copolymer according to claim 1 in powder form, as a solution in water, alcohol, or mixtures thereof.

4. A composition comprising a mixture of the crosslinkable copolymers comprising (a) (i) 80–99% by weight of vinylpyrrolidone and (ii), 1–20% by weight of a tertiary-amine-containing polymerizable monomer and (b) (i) 80–99% by Weight of vinylpyrrolidone and (ii) 1–20% by weight of an epoxide-containing polymerizable monomer in a weight ratio of about 1:2 to 2:1, respectively.

5. A composition according to claim 4 wherein said weight ratio is about 1:1.

6. A composition according to claim 4 which also includes an electrically conductive salt.

7. A solution of the composition of claim 4 in water, alcohol, or mixtures thereof.

* * * * *